Aug. 1, 1961 G. CAPE 2,994,348
METHOD OF REINFORCING AND WELDING TOROIDAL
OR SPIRAL SHAPED VESSELS
Filed Sept. 11, 1957 2 Sheets-Sheet 1

INVENTOR
G. CAPE

By Fetherstonhaugh & Co.
PATENT ATTORNEYS

Aug. 1, 1961 G. CAPE 2,994,348
METHOD OF REINFORCING AND WELDING TOROIDAL
OR SPIRAL SHAPED VESSELS
Filed Sept. 11, 1957 2 Sheets-Sheet 2
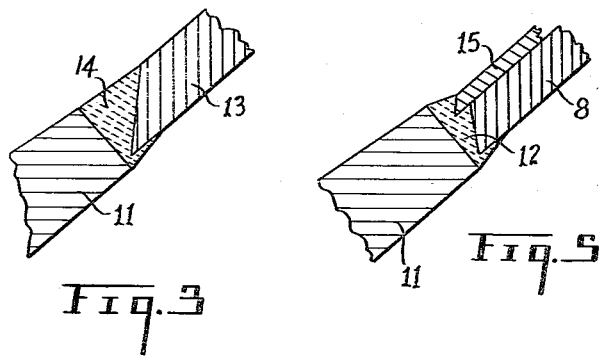
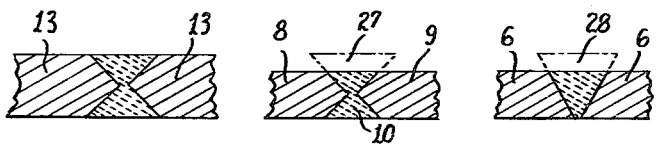
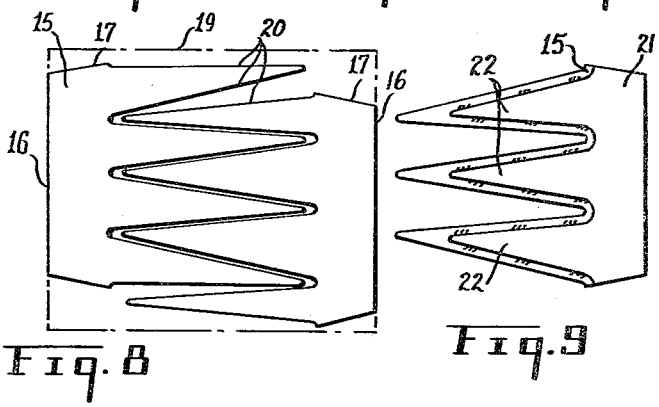
INVENTOR
G. CAPE
By Fetherstonhaugh & Co.
PATENT ATTORNEYS United States Patent Office 2,994,348
Patented Aug. 1, 1961

2,994,348
METHOD OF REINFORCING AND WELDING TOROIDAL OR SPIRAL SHAPED VESSELS
Gordon Cape, Lachine, Quebec, Canada, assignor to Dominion Bridge Company, Limited, Montreal, Quebec, Canada
Filed Sept. 11, 1957, Ser. No. 683,420
5 Claims. (Cl. 138—172)

This invention relates to the method of reinforcing and welding toroidal or spiral shaped pressure vessels or containers whose longitudinal axis is bent or curved.

The invention consists essentially in the provision of forming the structure of the pressure vessel or container from material having a thickness considerably less than that normally required at the inner or smaller radius of the structure and reinforcing the structure from the inner or smaller radius outwards over a predetermined area of the surface of the structure.

The pressure containers reinforced by the hereinafter described method may be for either internal or external pressure and have cross sections which are substantially circular, but may be of uniform, or increasing or decreasing cross-section and their longitudinal axis shall be curved or bent as in the case of toroidal or spiral shaped containers or elbows and bends.

The material forming the inner or smaller radius wall of toroidal or spiral shaped vessels, tubes, elbows and bends is, by the laws of statics, subject to greater forces per unit of length than at any other location in the structure. When the structure wall is kept uniform in thickness throughout, the forces in this inner wall govern the thickness required throughout, resulting in excessive weight and cost of the structure.

The object of the invention is, therefore, to reduce the overall weight of toroidal or spiral shaped vessels with a consequent reduction in the amount of weld required at all joints in the structure, and a reduction in overall cost.

A further object of the invention is to reduce the normal thickness of wall of toroidal or spiral pressure vessels to the value necessary at the largest radius of the structure and to reinforce the wall of the structure from its inner or smaller radius outwards over a predetermined area of the surface of the structure.

A further object of the invention is to reduce the cross section of welding required in all joints of a pressure container.

A further object of the invention is to reduce or eliminate the necessity for stress relieving of the welded joints of a pressure vessel by reducing the material thickness and weld sections.

These and other objects of the invention will be apparent from the following detailed specification and the accompanying drawings in which—

FIGURE 3 is an enlarged section of the welded joint between a scroll case and speed ring, in which the scroll case material is of normal thickness.

FIGURE 4 is a cross section through the weld joining the plates forming the sections of a scroll case of normal thickness as shown in FIGURE 3.

FIGURE 5 is an enlarged section similar to FIGURE 3 but showing the scroll case of reduced thickness of material and reinforced in the manner shown in FIGURE 1.

FIGURE 6 is a cross section of the horizontal welds of the scroll case taken on the line 6—6 of FIGURE 1 and showing in chain-dot lines the section of weld saved over that shown in FIGURE 4.

FIGURE 7 is a cross section of the vertical welds of the scroll case taken on the line 7—7 of FIGURE 1 and showing in chain-dot lines the section of weld saved over that normally used.

FIGURE 8 is a plan view showing the method of cutting two sections of reinforcing from a single plate with a minimum of wastage.

FIGURE 9 shows the method of superimposing two or more reinforcing plates one on top of the other for added strength.

Figure 1:
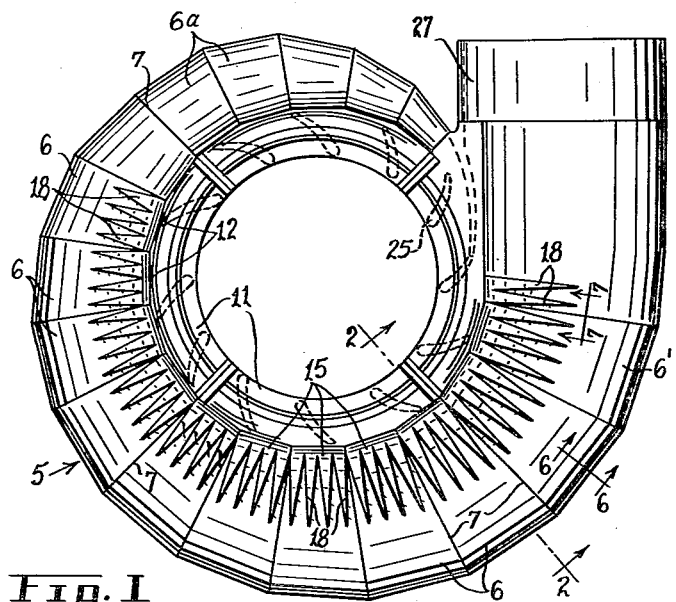
FIGURE 1 is a plan view of the scroll case and speed ring of a hydraulic turbine and showing the reinforcement plates welded to the surface of the scroll case and speed ring.
Figure 2:
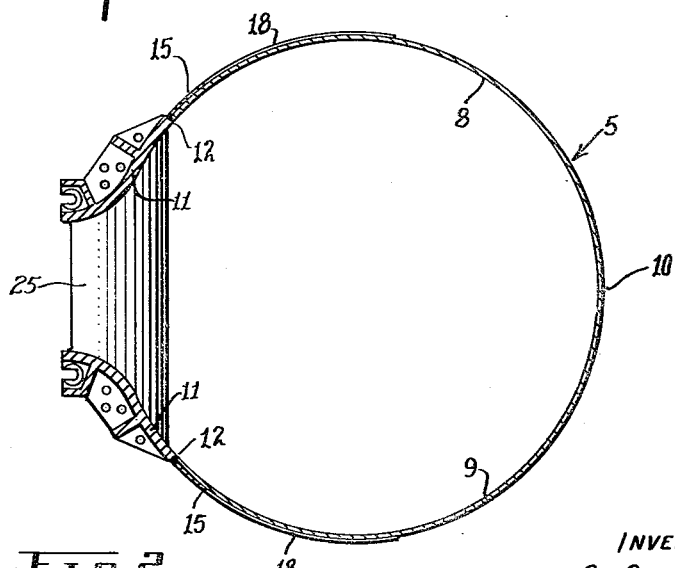
FIGURE 2 is an enlarged cross section taken on the line 2—2 of FIGURE 1 showing the scroll case secured to the speed ring and showing the reinforcements on the top and bottom outer surfaces of the scroll case.

The invention is here shown as being applied to the scroll case of a hydraulic turbine. However, it is understood that this application of the invention is illustrative only and that the invention can be applied to any pressure vessel of annular or doughnut shape or to bends and elbows which are under pressure. It is also to be understood that the construction of the reinforcing is suitable for vessels under either internal or external pressure.

Referring to the drawings, the scroll case 5 of a hydraulic turbine is usually made up of a number of sections 6, each formed into a partial cone from flat plate and welded together at their circumferential edges 7. The sections 6 are often, because of their large size, made from two plates 8 and 9 welded together horizontally at 10 on the outside diameter of the scroll case which is the point of least stress in the structure caused by internal fluid pressure. The inner horizontal edges of the two plates 8 and 9 are welded to the speed ring 11 at 12. The upper and lower portions of the speed ring 11 are joined by vanes 25 which are curved in the direction of flow.

The thickness of plate from which it has been customary to form the section 6 of the scroll case 5 of hydraulic turbines is shown at 13 in FIGURE 3 and the weld 14 in this case was of necessity of large section. Furthermore, plate 13 in recent and future scrolls approach a thickness in the order of 2 to 3 inches and plates of this thickness are very costly, are hard to roll with uniform quality and are extremely hard to bend into the conical or cylindrical shape necessary to form the sections 6. As shown in detail in FIGURE 5, the scroll case sections are formed from plates which are approximately two-thirds the thickness of the plate 13 formerly used and shown in FIGURE 3. An example of the reduction in thickness of the plates 8 and 9 is as follows: If the normal thickness of the plate 13 was 2″ then the thickness of the plates 8 and 9 would be in the order of 1¼″.

The thickness of the plates 8 and 9 forming the scroll case is now controlled by the thickness required in the plate at the largest horizontal radius of the scroll case in the region where the stress due to internal pressure is the least. The critical area of the scroll case is at its smallest radius adjacent its joint with the speed ring 11. This area is reinforced by the plates 15. The continuous edge 16 of the plates 15 are welded to the speed ring 11 by a build up of the weld 12 while the adjacent edges 17 of the reinforcement plates 15 are butt welded together over the joints of the sections 6. The radiating fingers 18 of the reinforcement plates 15 are welded intermittently to the underlying surfaces of the sections 6 of the scroll case 5 along the length of the fingers. If preferred, the welding of the fingers 18 to the scroll case 5 can be made continuous. The reinforcing fingers 18 of the reinforcing plates 15 extend outwardly to approximately a point slightly beyond the vertical axis of each section 6 of the scroll case 5 or further or less as required by the load to be supported. The thickness of the reinforcing plates 15 is such that, combined with the thickness of the plates 8 and 9 of the scroll case 5, the total thickness is approximately equal to the thickness of the plate 13 normally used to form the scroll case as shown in FIGURE 3. However, the cross-sectional area of the reinforcing fingers decreases when taken at planes perpendicular to and moving outwardly along the longitudinal axis of the fingers. The amount of reinforcement, therefore, decreases gradually commensurate with decreasing stress in the scroll case due to internal fluid pressure. This gives the required total thickness of material at the inner or smaller diameter of the structure, while allowing for a considerable reduction of material thickness at the outer or larger radius of the structure without sacrifice of strength of the structure as a whole.

One advantage of the finger shaped reinforcing plates 15 is that two reinforcing plates can be cut from a single sheet 19 of little more than the area of one reinforcing plate as shown in FIGURE 8, providing a considerable saving in cost. The sheet in this case can be either burned or saw-cut along the lines 20. The upper and lower reinforced plates 15 of each section 6 would be the same size so that pairs cut from one sheet 19 match for one section of the scroll case.

The size of the reinforcement plates 15 varies with the diameter of each of the sections 6 of the scroll case 5 to which the reinforcements are to be secured.

Instead of a single reinforcing plate 15 being welded to the surface of the scroll case sections 6, two or more reinforcing plates 21 having fingers 22 may be superimposed and welded to each other and to the scroll case. The superimposed reinforcing plate or plates 21, as shown in FIGURE 9, would be of smaller size than the one below and would be welded to each other along the edges of the fingers 22 in the same manner as the single plate 15 is welded to the scroll case sections 6.

With the above described construction a very considerable saving in weight of the scroll case 5 is obtained as the reduced thickness of the plates 8 and 9 is effective over the entire surface beyond the vertical centre line of each of the sections 6 and inwards of the vertical centre line over the area between the fingers 18. The saving in weight also extends to the welds of the structure as will be seen by a comparison of FIGURES 6 and 7 with FIGURE 4. In FIGURE 6 the chain dotted outline 27 represents the saving in the horizontal welds of the structure joining the plates 8 and 9 of each section, over the section of weld shown in FIGURE 4 for a similar joint where a normal thickness of plate 13 is used without reinforcements. In FIGURE 7 the chain dotted outline 28 represents the saving in the vertical welds joining the sections 6 together.

The reinforcing plates 15 are shown in FIGURE 1 as being welded to more than half of the sections 6 from the largest diameter section adjacent the inlet 27 of the scroll case 5 downwards towards the smaller diameter sections 6a. The smaller diameter sections 6a of the scroll case may, due to their small diameter and corresponding reduced load, be constructed of a single plate thickness without reinforcement. How many of the sections 6a which may be constructed without reinforcements will depend on the thickness of plate required for any one section and its thickness in relation to the thickness of the adjacent section with or without reinforcement, for more efficient welding of the sections to each other.

As the weld sections 6 in the above described structure are considerably reduced at all the joints between individual sections 6 and between the sections and the speed ring 5, due to thinner plates being used, stress relieving of the welds can, in most cases, be done away with, adding further to the saving in cost of the structure and making it practical to do the assembly at the construction site where thermal stress-relief equipment is not available.

While the invention has been shown as applied to the scroll case of a hydraulic turbine, it can equally well be applied to any other part of the intake to the machine where bends or elbows in the water passages leading to the machine require reinforcing in the manner described. Similarly, any form of pressure vessel of annular or doughnut shape can be formed from lighter weight plate and reinforced at their inner and shorter radius to give the strength required to meet the forces over the surface of the vessel from its smallest radius to its largest radius.

What I claim is:

1. A vessel the walls of which are subjected to pressure loads per unit of length, said vessel, comprising at least one curved plate having its axially-extending edges joined to form a flow path having a curvilinear longitudinal axis, the thickness of the curved plate being not substantially greater than that sufficient to withstand the maximum pressure load per unit of length in peripheral portions thereof which extend over the area of the largest radius of the flow path, and at least one second plate secured on the peripheral portions of the curved plate which extend over the area of the smallest radius of the flow path, said second plate having portions which extend along the curved plate toward the first-named peripheral portions and which decrease in cross-sectional area in planes normal to the radius of the flow path with increase in radius from said smallest toward said largest radius of the flow path.

2. A vessel according to claim 1 wherein said portions of the second plate comprise a series of fingers which taper toward said first-named peripheral portions.

3. A vessel according to claim 2 wherein said fingers extend along the curved plate beyond vertical lines passing through the curvilinear longitudinal axis of the flow path.

4. A vessel according to claim 1 wherein a plurality of second plates are secured on the peripheral portions of the curved plate which extend over the area of the smallest radius of the flow path, the plurality of second plates being superimposed one upon another and each having portions which extend with the curved plate toward the first-named peripheral portions, the total cross-sectional area of said portions of each of said plurality of second plates decreasing in magnitude in planes normal to the radius of the flow path with increase in radius from said smallest toward said largest radius of the flow path.

5. A vessel according to claim 4 wherein said portions of each of said plurality of second plates comprise a series of fingers which taper toward said first-named peripheral portions, each superimposed plate having fingers of shorter length and narrower width than the plate below and each finger of a superimposed plate extending along the longitudinal axis of a finger of the plate below.

References Cited in the file of this patent

UNITED STATES PATENTS

| 1,483,995 | Taylor | Feb. 19, 1924 |
| 1,526,917 | Leland | Feb. 17, 1925 |
| 1,537,404 | Bundy | May 12, 1925 |
| 2,392,967 | Balkin | Jan. 15, 1946 |
| 2,837,810 | Ekholm | June 10, 1958 |

FOREIGN PATENTS

| 19,194 | Great Britain | Aug. 20, 1908 |
| 254,464 | Great Britain | July 8, 1926 |
| 283,156 | Germany | Apr. 1, 1915 |